US012665208B2

(12) United States Patent
Miyajima

(10) Patent No.: US 12,665,208 B2
(45) Date of Patent: Jun. 23, 2026

(54) FUEL CELL SYSTEM

(71) Applicant: HONDA MOTOR CO., LTD., Tokyo (JP)

(72) Inventor: Kazuyoshi Miyajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 513 days.

(21) Appl. No.: 18/372,109

(22) Filed: Sep. 24, 2023

(65) Prior Publication Data

US 2024/0105974 A1     Mar. 28, 2024

(30) Foreign Application Priority Data

Sep. 27, 2022    (JP) ................................. 2022-153718

(51) Int. Cl.
| | |
|---|---|
| *H01M 8/04082* | (2016.01) |
| *H01M 8/04089* | (2016.01) |
| *H01M 8/04223* | (2016.01) |
| *H01M 8/0444* | (2016.01) |
| *H01M 8/04537* | (2016.01) |
| *H01M 8/04746* | (2016.01) |

(52) U.S. Cl.
CPC ... *H01M 8/04201* (2013.01); *H01M 8/04097* (2013.01); *H01M 8/04231* (2013.01); *H01M 8/04462* (2013.01); *H01M 8/04552* (2013.01); *H01M 8/04559* (2013.01); *H01M 8/04753* (2013.01); *H01M 8/04761* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 2004/0110048 A1 | 6/2004 | Hiramatsu et al. | |
| 2005/0271918 A1* | 12/2005 | Murakami ........ | H01M 8/04007 |
| | | | 429/444 |
| 2007/0065711 A1 | 3/2007 | Gopal | |
| 2023/0378489 A1 | 11/2023 | Toida et al. | |

FOREIGN PATENT DOCUMENTS

| | | |
|---|---|---|
| EP | 2 017 915 A1 | 1/2009 |
| JP | H08-236131 A | 9/1996 |
| JP | 2000-058092 A | 2/2000 |
| JP | 2000-243417 A | 9/2000 |
| JP | 2001052727 A * | 2/2001 |
| JP | 2004-192845 A | 7/2004 |
| JP | 2008-251312 A | 10/2008 |

(Continued)

OTHER PUBLICATIONS

Machine Translation of JP 2001-052727A (Year: 2001).*

(Continued)

*Primary Examiner* — Gregg Cantelmo
(74) *Attorney, Agent, or Firm* — Carrier, Shende & Associates P.C.; Joseph P. Carrier; Fulchand P. Shende

(57) ABSTRACT
A fuel cell system has a fuel cell and a controller. The controller controls an oxygen purge valve and a hydrogen purge valve so that a valve-opening period of the oxygen purge valve provided in an oxygen purge channel and a valve opening period of the hydrogen purge valve provided in a hydrogen purge path do not overlap with each other.

7 Claims, 4 Drawing Sheets

(56)  References Cited

FOREIGN PATENT DOCUMENTS

| JP | 2009-011882 A | 1/2009 |
| --- | --- | --- |
| JP | 2010-016006 A | 1/2010 |
| JP | 2011-065905 A | 3/2011 |
| JP | 2012-169053 A | 9/2012 |
| JP | 2013-175342 A | 9/2013 |
| JP | 2023-170859 A | 12/2023 |

OTHER PUBLICATIONS

Office Action dated Feb. 20, 2024 issued in the corresponding Japanese Patent Application No. 2022-153718 with the English machine translation thereof.

* cited by examiner

FUEL CELL SYSTEM

CROSS-REFERENCE TO RELATED APPLICATIONS

This application is based upon and claims the benefit of priority from Japanese Patent Application No. 2022-153718 filed on Sep. 27, 2022, the contents of which are incorporated herein by reference.

BACKGROUND OF THE INVENTION

Field of the Invention

The present invention relates to a fuel cell system.

Description of the Related Art

In recent years, research and development have been conducted on fuel cell that contribute to energy efficiency in order to ensure that more people have access to affordable, reliable, sustainable and modern energy. Further, in order to reduce the load on the environment, emissions control has been more stringent for moving bodies such as automobiles having internal combustion engines. For this reason, attempts have been made to mount a fuel cell instead of an internal combustion engine in a moving object such as an automobile. Because $CO_2$, $SO_x$, $NO_x$, and the like are not discharged from the moving body on which the fuel cell is mounted, the burden on the environment can be reduced.

JP 2008-251312 A, for example, discloses a fuel cell system including a fuel cell. The fuel cell system disclosed in JP 2008-251312 A includes the fuel cell, an oxygen circulation path, and a hydrogen circulation path. The fuel cell generates electric power by electrochemical reactions between oxygen gas and hydrogen gas. Oxygen gas that has not reacted in the fuel cell is returned to the fuel cell through the oxygen circulation path. On the other hand, hydrogen gas that has not reacted in the fuel cell is returned to the fuel cell through the hydrogen circulation path.

In the fuel cell system disclosed in JP 2008-251312 A, a hydrogen-side impurity filter for removing hydrogen gas impurities and an oxygen-side impurity filter for removing oxygen gas impurities are provided in order to suppress a decrease in power generation efficiency caused by impurities such as water accumulated inside the fuel cell due to continuous supply of gas. The impurities adhering to the impurity filters increase pressure loss, and thereby affect the power generation performance. Therefore, it is necessary to periodically replace the impurity filters.

SUMMARY OF THE INVENTION

In recent years, how to use a fuel cell system having a circulation path in a closed space has been studied. In the case where the fuel cell system is used in a closed space, replacement of the impurity filters may be difficult. Therefore, the hydrogen gas and the oxygen gas are directly purged. However, in this case, there is a concern that the purged hydrogen gas and the purged oxygen gas together may cause combustion if there is an ignition source. It is also conceivable to prepare an inert gas for diluting the hydrogen gas, but this is not realistic because the fuel cell system becomes large. Therefore, it is required to avoid the risk of combustion without using a gas (for example, an inert gas) other than the gas used for power generation in the fuel cell, while eliminating the need for the impurity filters.

An object of the present invention is to solve the aforementioned problem.

According to an aspect of the present invention, there is provided a fuel cell system including: a fuel cell configured to generate electric power by electrochemical reactions between an oxygen gas and a hydrogen gas; an oxygen gas supply path configured to supply the oxygen gas to the fuel cell; an oxygen circulation path configured to return to the oxygen gas supply path an oxygen-containing gas containing the oxygen gas discharged from the fuel cell; a hydrogen gas supply path configured to supply the hydrogen gas to the fuel cell; a hydrogen circulation path configured to return to the hydrogen supply path a hydrogen-containing gas containing the hydrogen gas discharged from the fuel cell; an oxygen purge channel configured to discharge the oxygen-containing gas from the oxygen circulation path to an outside of the fuel cell system; a hydrogen purge channel configured to discharge the hydrogen-containing gas from the hydrogen circulation path to the outside of the fuel cell system; an oxygen purge valve disposed on the oxygen purge channel; a hydrogen purge valve disposed on the hydrogen purge channel; and a controller configured to control the oxygen purge valve and the hydrogen purge valve in a manner so that a valve opening period of the oxygen purge valve does not overlap with a valve opening period of the hydrogen purge valve.

According to the above aspect, it is possible to prevent the oxygen and the hydrogen from being contained together in the purged gas. As a result, even if there is an ignition source, the risk of combustion can be avoided without using an inert gas or impurity filters.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
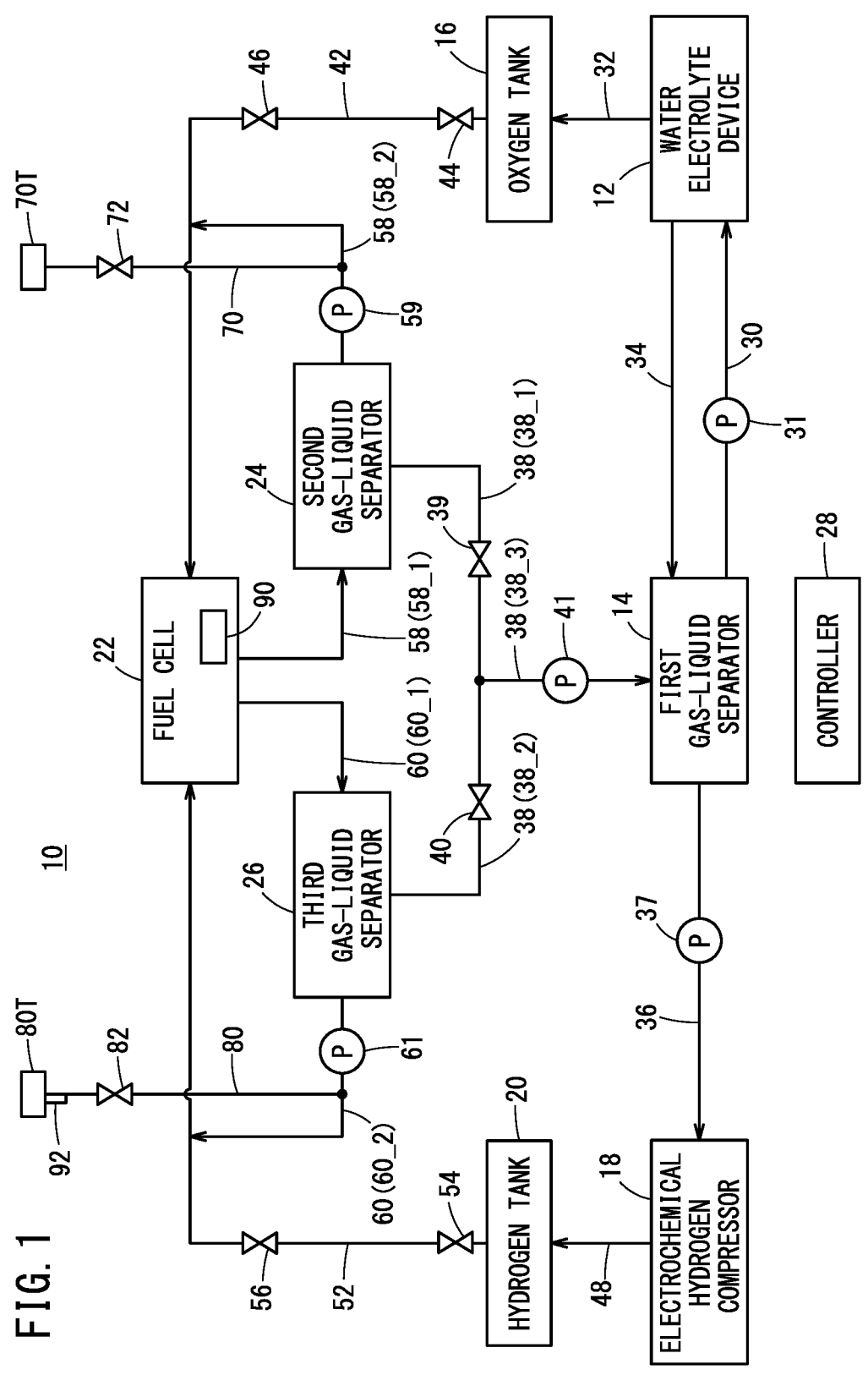
FIG. 1 is a schematic diagram showing a fuel cell system according to an embodiment.

FIG. 1 is a schematic diagram showing a fuel cell system 10. The fuel cell system 10 is used in a closed space. The fuel cell system 10 includes a water electrolysis device 12, a first gas-liquid separator 14, an oxygen tank 16, a hydrogen compressor 18, a hydrogen tank 20, a fuel cell 22, a second gas-liquid separator 24, a third gas-liquid separator 26, and a controller 28.

The water electrolysis device 12 is a differential pressure water electrolysis device that generates hydrogen gas and oxygen gas having a pressure higher than the pressure of the hydrogen gas by water electrolysis. Water for water electrolysis is supplied from the first gas-liquid separator 14 to the water electrolysis device 12 via a water supply path 30. The water supply path 30 allows the first gas-liquid separator 14 and the water electrolysis device 12 to communicate with each other. The water supply path 30 is provided with a pump 31. The controller 28 turns on and off the pump 31. When the pump 31 is turned on, the pump 31 forces the water stored in the first gas-liquid separator 14 to flow toward the water electrolysis device 12.

The water electrolysis device 12 includes one or more unit cells. The unit cell includes a membrane electrode assembly (MEA) in which an electrolyte membrane is interposed between an anode and a cathode. The water electrolysis device 12 supplies water from the first gas-liquid separator 14 to the cathode of the unit cell. The unit cell electrolyzes water based on a voltage applied to the anode and the cathode. In this case, a high-pressure oxygen gas with its pressure increased is generated at the anode, and a hydrogen gas without its pressure increased is generated at the cathode.

The high-pressure oxygen gas generated in the unit cells of the water electrolysis device 12 is stored as a pure oxygen in the oxygen tank 16 via an oxygen discharge path 32. The oxygen discharge path 32 is a conduit for allowing the oxygen gas to flow from the water electrolysis device 12 to the oxygen tank 16 by connecting the water electrolysis device 12 to the oxygen tank 16.

The fluid discharged from the water electrolysis device 12 contains a hydrogen gas generated in the unit cells and residual water. The discharged fluid is supplied to the first gas-liquid separator 14 via a water discharge path 34. The water discharge path 34 is a conduit for allowing the discharged fluid to flow from the water electrolysis device 12 to the first gas-liquid separator 14 by connecting the water electrolysis device 12 to the first gas-liquid separator 14.

The first gas-liquid separator 14 separates the discharged fluid from the water electrolysis device 12 into a gaseous component (hydrogen gas) and a liquid component (liquid water). The gaseous component separated in the first gas-liquid separator 14 is supplied to the hydrogen compressor 18 via a hydrogen supply path 36. The hydrogen supply path 36 connects the first gas-liquid separator 14 to the hydrogen compressor 18. The hydrogen supply path 36 is provided with a pump 37. The controller 28 turns on and off the pump 37. When the pump 37 is turned on, the pump 37 forces the hydrogen gas stored in the first gas-liquid separator 14 to flow toward the hydrogen compressor 18.

The liquid component (liquid water) separated in the first gas-liquid separator 14 is temporarily stored in the first gas-liquid separator 14 and is supplied to the water electrolysis device 12 via the water supply path 30. The water stored in the first gas-liquid separator 14 includes water supplied through a water supply path 38. The water supply path 38 is a conduit for allowing water to flow from the second gas-liquid separator 24 and the third gas-liquid separator 26 to the first gas-liquid separator 14. The water supply path 38 includes a first water supply path 38_1 and a second water supply path 38_2.

The first water supply path 38_1 allows the second gas-liquid separator 24 and the first gas-liquid separator 14 to communicate with each other. The second water supply path 38_2 allows the third gas-liquid separator 26 and the first gas-liquid separator 14 to communicate with each other. In the present embodiment, the downstream end portion of the first water supply path 38_1 and the downstream end portion of the second water supply path 38_2 are formed as one merging path 38_3. A first water supply valve 39 is provided on the first water supply path 38_1, and a second water supply valve 40 is provided on the second water supply path 38_2. The opening and closing of the first water supply valve 39 and the second water supply valve 40 are controlled by the controller 28. The merging path 38_3 is provided with a pump 41. The controller 28 turns on and off the pump 41. The pump 41, when being turned on, forces water stored in the second gas-liquid separator 24 or the third gas-liquid separator 26 to flow toward the first gas-liquid separator 14.

The oxygen tank 16 stores the high-pressure oxygen gas generated by the water electrolysis in the water electrolysis device 12. The high-pressure oxygen gas stored in the oxygen tank 16 is supplied to the fuel cell 22 via an oxygen gas supply path 42. The oxygen gas supply path 42 is a conduit for allowing the high-pressure oxygen gas stored in the oxygen tank 16 to flow to the fuel cell 22 by connecting the oxygen tank 16 to the fuel cell 22. The oxygen gas supply path 42 is provided with an oxygen valve 44 and a pressure reducing valve 46. The oxygen valve 44 is disposed near the outlet of the oxygen tank 16. The opening and closing of the oxygen valve 44 are controlled by the controller 28. The pressure reducing valve 46 reduces the pressure of the high-pressure oxygen gas that has been stored in the oxygen tank 16. The pressure of the oxygen gas reduced by the pressure reducing valve 46 is still higher than the reference pressure. The reference pressure is, for example, the pressure inside the first gas-liquid separator 14.

The hydrogen compressor 18 is an electrochemical hydrogen compressor (EHC) that electrochemically pressurizes hydrogen. The electrochemical hydrogen compressor 18 raises the pressure of the hydrogen gas supplied from the first gas-liquid separator 14 to generate high-pressure hydrogen gas. The hydrogen gas supplied from the first gas-liquid separator 14 is the hydrogen gas generated by the water electrolysis device 12.

The electrochemical hydrogen compressor 18 has one or more unit cells. The unit cell includes a membrane electrode assembly (MEA) in which an electrolyte membrane is interposed between an anode and a cathode. The electrochemical hydrogen compressor 18 supplies the hydrogen gas supplied from the first gas-liquid separator 14 to the anode of the unit cell. The unit cell ionizes the hydrogen gas based on a voltage applied between the anode and the cathode. Protons obtained by ionizing the hydrogen gas reach the cathode via the electrolyte membrane, whereby pressurized hydrogen gas is generated.

The high-pressure hydrogen gas generated in the unit cells of the electrochemical hydrogen compressor 18 is stored in the hydrogen tank 20 via a hydrogen discharge passage 48. The hydrogen discharge passage 48 is a conduit for allowing the hydrogen gas to flow from the electrochemical hydrogen compressor 18 to the hydrogen tank 20 by connecting the electrochemical hydrogen compressor 18 to the hydrogen tank 20.

The hydrogen tank 20 stores the high-pressure hydrogen gas the pressure of which has been raised by the electrochemical hydrogen compressor 18. The high-pressure hydrogen gas stored in the hydrogen tank 20 is supplied to the fuel cell 22 via a hydrogen gas supply path 52. The hydrogen gas supply path 52 is a conduit for allowing the high-pressure hydrogen gas stored in the hydrogen tank 20 to flow to the fuel cell 22 by connecting the hydrogen tank 20 to the fuel cell 22. The hydrogen gas supply path 52 is provided with a hydrogen valve 54 and a pressure reducing valve 56. The hydrogen valve 54 is disposed near the outlet of the hydrogen tank 20. The opening and closing of the hydrogen valve 54 are controlled by the controller 28. The pressure reducing valve 56 reduces the pressure of the high-pressure hydrogen gas stored in the hydrogen tank 20.

The pressure of the hydrogen gas reduced by the pressure reducing valve 56 is still higher than the reference pressure.

The fuel cell 22 has a plurality of unit cells. Each unit cell includes a membrane electrode assembly (MEA) in which an electrolyte membrane is interposed between an anode and a cathode. In the fuel cell 22, the oxygen gas having a pressure higher than the reference pressure is supplied from the oxygen tank 16 via the pressure reducing valve 46 to the cathode of each unit cell. In the fuel cell 22, the hydrogen gas having a pressure higher than the reference pressure is supplied from the hydrogen tank 20 via the pressure reducing valve 56 to the anode of each unit cell. Each unit cell generates electric power by electrochemical reactions between the oxygen gas and the hydrogen gas.

The oxygen-containing gas containing the oxygen gas unreacted in each unit cell of the fuel cell 22 is supplied to the oxygen gas supply path 42 via an oxygen circulation path 58. The oxygen circulation path 58 is a conduit for returning the oxygen-containing gas discharged from the fuel cell 22 to the oxygen gas supply path 42. The oxygen circulation path 58 includes an upstream portion 58_1 and a downstream portion 58_2. The upstream portion 58_1 connects the fuel cell 22 to the second gas-liquid separator 24. The downstream portion 58_2 connects the second gas-liquid separator 24 to the oxygen gas supply path 42. A pump 59 is provided in the oxygen circulation path 58. The controller 28 turns on and off the pump 59. When being turned on, the pump 59 forces the oxygen-containing gas discharged from the fuel cell 22 to circulate.

The hydrogen-containing gas containing hydrogen gas unreacted in each unit cell of the fuel cell 22 is supplied to the hydrogen gas supply path 52 via a hydrogen circulation path 60. The hydrogen circulation path 60 is a conduit for returning the hydrogen-containing gas discharged from the fuel cell 22 to the hydrogen gas supply path 52. The hydrogen circulation path 60 includes an upstream portion 60_1 and a downstream portion 60_2. The upstream portion 60_1 connects the fuel cell 22 to the third gas-liquid separator 26. The downstream portion 60_2 connects the third gas-liquid separator 26 to the hydrogen gas supply path 52. A pump 61 is provided in the hydrogen circulation path 60. The controller 28 turns on and off the pump 61. When being turned on, the pump 61 forces the hydrogen-containing gas discharged from the fuel cell 22 to circulate.

The second gas-liquid separator 24 separates the oxygen-containing gas discharged from the fuel cell 22 into a gaseous component (oxygen gas) and a liquid component (liquid water). The gaseous component separated by the second gas-liquid separator 24 is supplied to the oxygen gas supply path 42 via the downstream portion 58_2 of the oxygen circulation path 58. The liquid component (liquid water) separated by the second gas-liquid separator 24 is the water generated by oxidation-reduction reactions between oxygen and hydrogen in each unit cell of the fuel cell 22. The liquid component (liquid water) is temporarily stored in the second gas-liquid separator 24 and is supplied to the first gas-liquid separator 14.

The third gas-liquid separator 26 separates the hydrogen-containing gas discharged from the fuel cell 22 into a gaseous component (hydrogen gas) and a liquid component (liquid water). The gaseous component separated by the third gas-liquid separator 26 is supplied to the hydrogen gas supply path 52 via the downstream portion 60_2 of the hydrogen circulation path 60. The liquid component (liquid water) separated by the third gas-liquid separator 26 is the water generated by oxidation-reduction reactions between oxygen and hydrogen in each unit cell of the fuel cell 22.

The liquid component (liquid water) is temporarily stored in the third gas-liquid separator 26 and is supplied to the first gas-liquid separator 14.

The controller 28 is a computer that controls the fuel cell system 10. The controller 28 includes one or more processors and a storage medium. The storage medium may be constituted by a volatile memory and a non-volatile memory. Examples of such a processor may include a CPU (Central Processing Unit), an MCU, or the like. As an example of the volatile memory, there may be cited a RAM or the like. As an example of the nonvolatile memory, there may be cited a ROM, a flash memory, or the like.

The controller 28 turns on a power supply of the water electrolysis device 12 to apply a voltage to the anode and the cathode of the unit cell. In addition, the controller 28 turns on the pump 31 to supply water from the first gas-liquid separator 14 to the water electrolysis device 12. The water electrolysis device 12 in an operating state performs electrolysis of water (water electrolysis). When the controller 28 stops applying a voltage to the unit cell and supplying water to the water electrolysis device 12, the water electrolysis device 12 is placed into a non-operating state.

The controller 28 turns on a power supply of the electrochemical hydrogen compressor 18 to apply a voltage to the anode and the cathode of the unit cell. In addition, the controller 28 turns on the pump 37 to supply hydrogen gas from the first gas-liquid separator 14 to the electrochemical hydrogen compressor 18. The electrochemical hydrogen compressor 18 in an operating state raises the pressure of the hydrogen gas. When the controller 28 stops applying the voltage to the unit cell and supplying the hydrogen gas to the electrochemical hydrogen compressor 18, the electrochemical hydrogen compressor 18 is placed into a non-operating state.

The operation of the water electrolysis device 12 is paired with the operation of the electrochemical hydrogen compressor 18. That is, when the controller 28 brings the water electrolysis device 12 into the operating state, the controller 28 also brings the electrochemical hydrogen compressor 18 into the operating state. On the other hand, when the controller 28 brings the water electrolysis device 12 into the non-operating state, the controller 28 also brings the electrochemical hydrogen compressor 18 into the non-operating state.

While the water electrolysis device 12 and the electrochemical hydrogen compressor 18 are in operation, the controller 28 controls the oxygen valve 44 and the hydrogen valve 54 to be closed. In this case, the high-pressure oxygen gas generated by the water electrolysis of the water electrolysis device 12 is stored in the oxygen tank 16, and the high-pressure hydrogen gas pressurized by the electrochemical hydrogen compressor 18 is stored in the hydrogen tank 20. In this case, the high-pressure oxygen gas stored in the oxygen tank 16 and the high-pressure hydrogen gas stored in the hydrogen tank 20 are not supplied to the fuel cell 22. Therefore, the fuel cell 22 is not in operation and power generation is not performed.

On the other hand, while the water electrolysis device 12 and the electrochemical hydrogen compressor 18 are not in operation, the controller 28 opens the oxygen valve 44 and the hydrogen valve 54 to bring the fuel cell 22 into an operating state. In this case, the high-pressure oxygen gas stored in the oxygen tank 16 is supplied to the fuel cell 22 after the pressure of the oxygen is reduced by the pressure reducing valve 46. The high-pressure hydrogen gas stored in the hydrogen tank 20 is supplied to the fuel cell 22 after the pressure of the hydrogen is reduced by the pressure reducing valve 56. The fuel cell 22 generates electric power. While the fuel cell 22 is in operation, the controller 28 turns on the pump 59 to supply to the fuel cell 22 the oxygen-containing gas discharged from the fuel cell 22. Further, the controller 28 turns on the pump 61 to supply to the fuel cell 22 the hydrogen-containing gas discharged from the fuel cell 22.

The operation of the water electrolysis device 12 and the electrochemical hydrogen compressor 18 and the operation of the fuel cell 22 may be alternately performed.

While the fuel cell 22 is in operation, the controller 28 controls an oxygen purge valve 72 provided in an oxygen purge channel 70 and a hydrogen purge valve 82 provided in a hydrogen purge channel 80.

The oxygen purge channel 70 is a conduit for purging the oxygen-containing gas from the oxygen circulation path 58 to the outside of the fuel cell system 10. When the oxygen purge valve 72 is opened, the oxygen-containing gas flows from the oxygen circulation path 58 into the oxygen purge channel 70 and is purged from an outlet 70T of the oxygen purge channel 70 to the outside of the fuel cell system 10.

The hydrogen purge channel 80 is a conduit for purging the hydrogen-containing gas from the hydrogen circulation path 60 to the outside of the fuel cell system 10. When the hydrogen purge valve 82 is opened, the hydrogen-containing gas flows from the hydrogen circulation path 60 into the hydrogen purge channel 80 and is purged from an outlet 80T of the hydrogen purge channel 80 to the outside of the fuel cell system 10.

Figure 2:
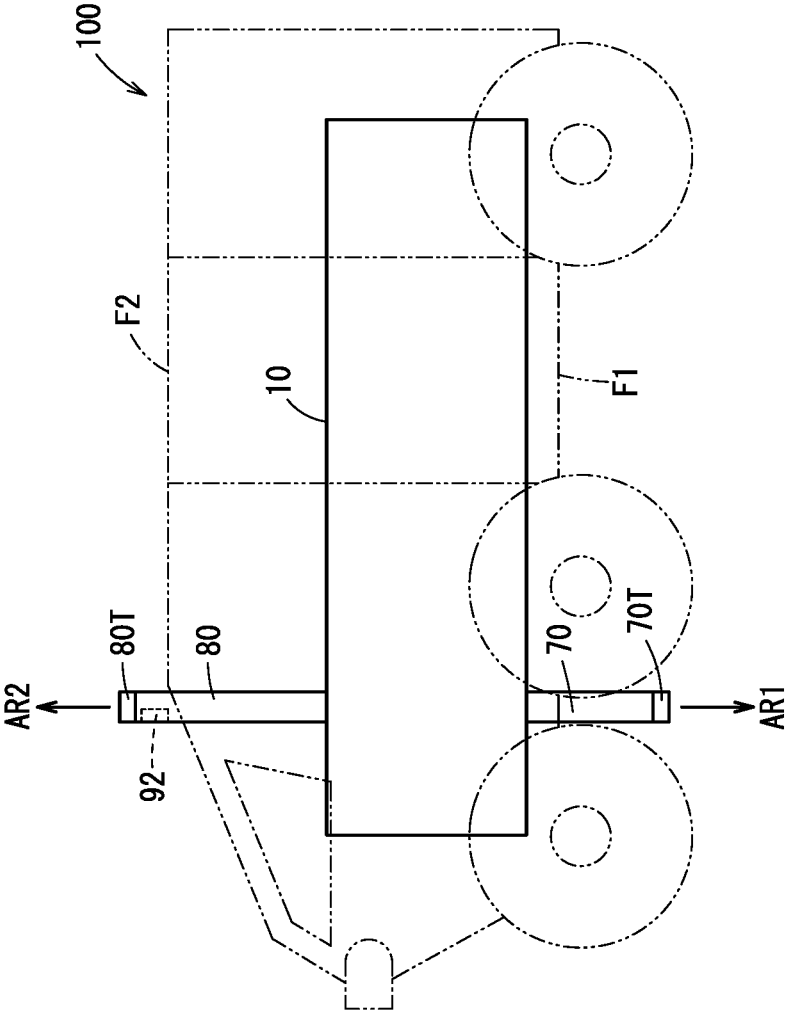
FIG. 2 is a diagram showing an arrangement example of an outlet of an oxygen purge channel and an outlet of the hydrogen purge channel.

FIG. 2 is a diagram showing an arrangement example of the outlet 70T of the oxygen purge channel 70 and the outlet 80T of the hydrogen purge channel 80. The outlet 70T of the oxygen purge channel 70 is disposed on the side of and spaced from the first surface F1 of a moving body 100 on which the fuel cell system 10 is mounted. The outlet 80T of the hydrogen purge channel 80 is disposed on the side of and spaced from the second surface F2 of the moving body 100 opposite to the first surface F1. In addition, the purge direction AR1 of the oxygen-containing gas purged from the oxygen purge channel 70 is different from the purge direction AR2 of the hydrogen-containing gas purged from the hydrogen purge channel 80. In this way, the risk that the purged gas contains both hydrogen and oxygen can be reduced.

Figure 3:
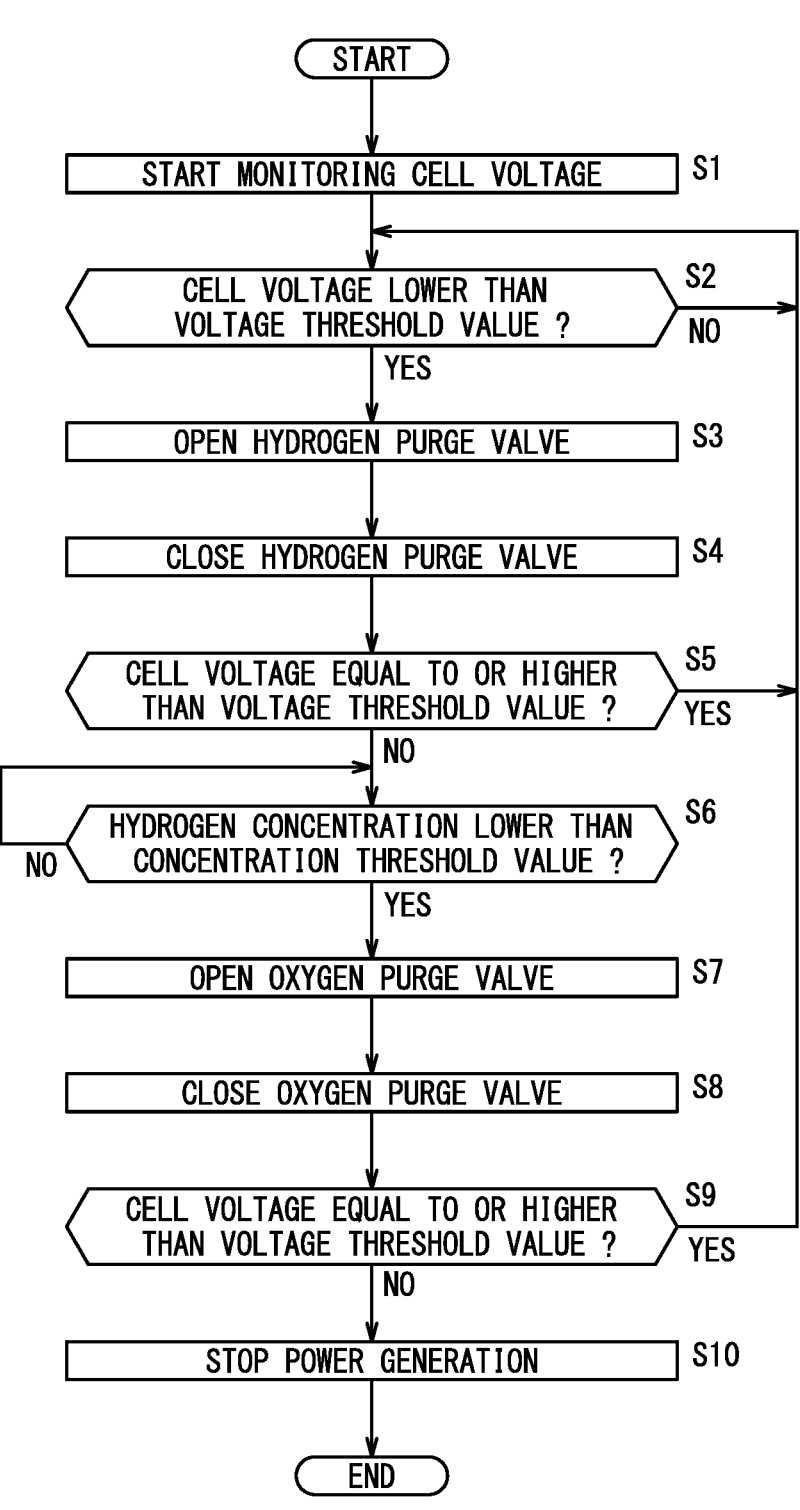
FIG. 3 is a flowchart showing a procedure of valve control processing.
Figure 4:
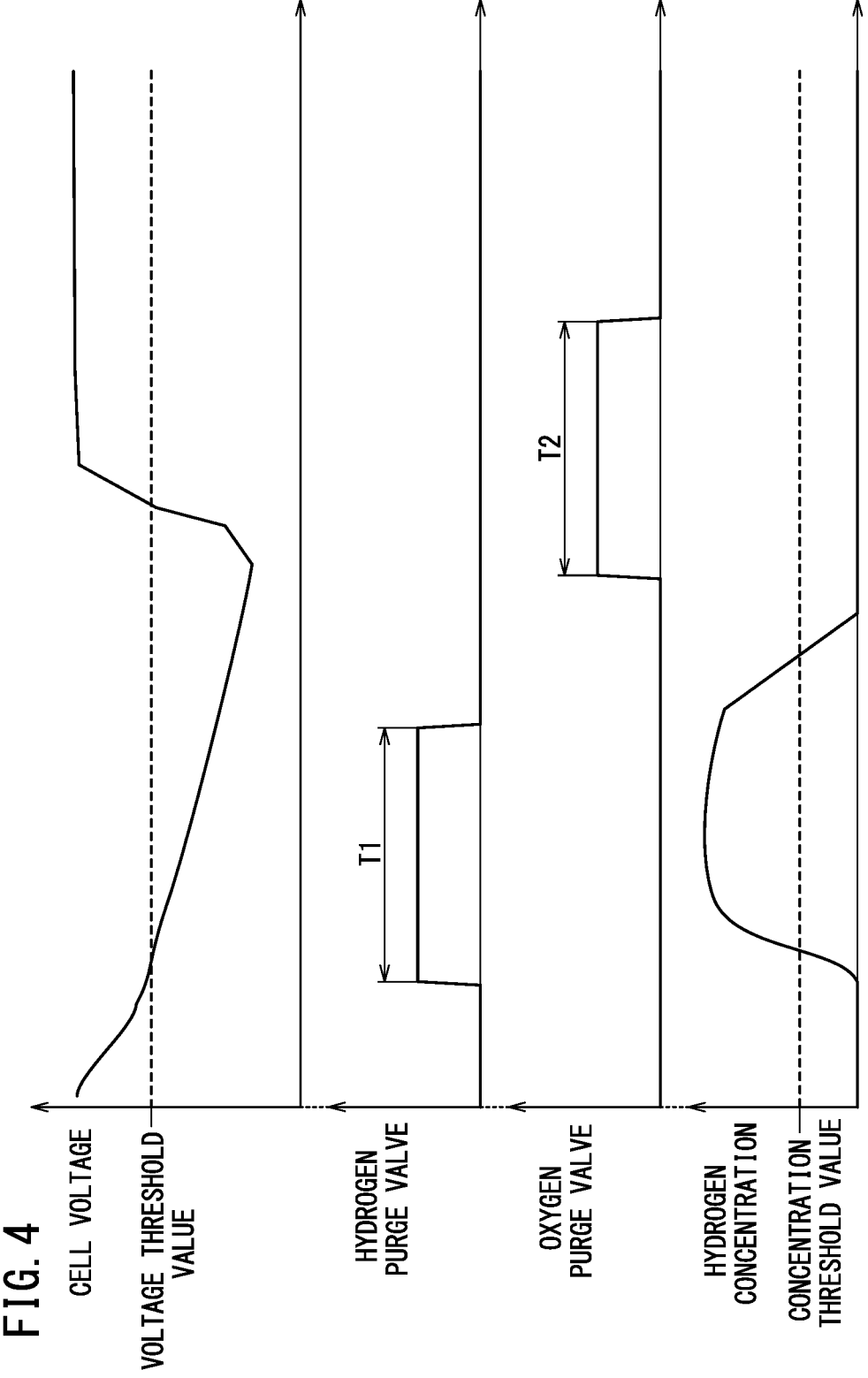
FIG. 4 is a time chart during the valve control processing.

FIG. 3 is a flowchart showing a procedure of valve control processing. FIG. 4 is a time chart during the valve control processing. The valve control processing is a process of controlling the oxygen purge valve 72 and the hydrogen purge valve 82. When it is detected that the oxygen valve 44 and the hydrogen valve 54 are opened, the valve control processing proceeds to step S1.

In step S1, the controller 28 monitors a voltage (cell voltage) at the fuel cell 22 by supplying predetermined amounts of hydrogen-gas and oxygen-gas. In this case, the voltage (cell voltage) is detected by using a voltage sensor 90 (FIG. 1) provided in the fuel cell 22, and the controller 28 stores the voltage in the storage medium in time sequence. The cell voltage may be a voltage across a plurality of unit cells connected in series, or may be a voltage of each unit cell. When the voltage monitoring is started, the valve control processing transitions to step S2.

In the present embodiment, the oxygen gas and the hydrogen gas that have not reacted in the fuel cell 22 are discharged from the fuel cell 22 and then supplied to the fuel cell 22 again. That is, the oxygen gas and the hydrogen gas supplied to the fuel cell 22 circulate through the fuel cell 22. In this case, the ratio of the impurities accumulated in the fuel cell 22 tends to gradually increase. When the impurities are accumulated in the fuel cell 22, the power generation efficiency of the fuel cell 22 decreases and the cell voltage decreases.

In step S2, the controller 28 compares the stored cell voltage with a predetermined voltage threshold value. In the case where the stored cell voltage is equal to or greater than the voltage threshold value, the valve control processing remains at step S2. On the other hand, when the cell voltage becomes lower than the voltage threshold value, the valve control processing transitions to step S3.

In step S3, the controller 28 opens the hydrogen purge valve 82 to purge the hydrogen-containing gas discharged from the fuel cell 22 to the outside of the fuel cell system 10. The controller 28 may control the pump 61 to increase the pressure applied to the hydrogen-containing gas before opening the hydrogen purge valve 82.

The controller 28 starts monitoring the concentration of hydrogen at the outlet 80T of the hydrogen purge channel 80 when opening the hydrogen purge valve 82. In this case, the controller 28 stores in time sequence the concentration of hydrogen detected by a concentration sensor 92 (FIGS. 1 and 2) provided in the hydrogen purge channel 80 in the vicinity of the outlet 80T. If the hydrogen purge valve 82 is opened and the hydrogen concentration is started to be monitored, then the valve control processing transitions to step S4.

In step S4, the controller 28 closes the hydrogen purge valve 82 after a predetermined valve-opening period T1 (FIG. 4) has elapsed since the opening of the hydrogen purge valve 82. When the hydrogen purge valve 82 is closed, the valve control processing transitions to step S5.

At step S5, the controller 28 again compares the cell voltage with the voltage threshold to confirm recovery of the cell voltage. In the case where the cell voltage is equal to or greater than the voltage threshold value, the valve control processing returns to step S2. On the other hand, when the cell voltage is still lower than the voltage threshold value, the valve control processing proceeds to step S6.

The timing of the comparison between the cell voltage and the voltage threshold value for confirming the recovery of the cell voltage is not limited to the time after the hydrogen purge valve 82 is closed, but may be the time while the hydrogen purge valve 82 is opened. In this case, in the valve control processing, step S5 is executed before step S4. In short, the comparison between the cell voltage and the voltage threshold value for confirming the recovery of the cell voltage is performed anytime after the elapse of a predetermined period from the opening of the hydrogen purge valve 82.

In step S6, the controller 28 compares the hydrogen concentration stored in the storage medium with predetermined concentration threshold. In the case where the hydrogen concentration is equal to or greater than the concentration threshold, the valve control processing remains at step S6. On the other hand, when the hydrogen concentration is lower than the concentration threshold, the valve control processing proceeds to step S7.

In step S7, the controller 28 opens the oxygen purge valve 72 to purge the oxygen-containing gas discharged from the fuel cell 22 to the outside of the fuel cell system 10. The controller 28 may control the pump 59 to increase the pressure applied to the oxygen-containing gas before opening the oxygen purge valve 72. When the oxygen purge valve 72 is opened, the control processing transitions to step S8.

In step S8, the controller 28 closes the oxygen purge valve 72 after a predetermined valve-opening period T2 (FIG. 4)

has elapsed since the opening of the oxygen purge valve 72. When the oxygen purge valve 72 is closed, the control processing transitions to step S9.

At step S9, the controller 28 again compares the cell voltage with the voltage threshold value to confirm recovery of the cell voltage. In the case where the stored cell voltage is equal to or greater than the voltage threshold value, the valve control processing returns to step S2. On the other hand, when the cell voltage is still lower than the voltage threshold value, the valve control processing proceeds to step S10.

In step S10, the controller 28 closes the oxygen valve 44 and hydrogen valve 54 to stop the power generation of the fuel cell 22. In this case, the valve control processing is ended.

As described above, in the present embodiment, the controller 28 controls the oxygen purge valve 72 and the hydrogen purge valve 82 such that the valve-open period T1 of the hydrogen purge valve 82 and the valve open period T2 of the oxygen-purge valve 72 do not overlap each other. This substantially reduces the situation where both the oxygen and the hydrogen are contained in the purged gas at the same time, thereby avoiding the risk of causing combustion if there is an ignition source.

In the present embodiment, the valve-open period T1 of the hydrogen purge valve 82 is earlier than the valve-open period T2 of the oxygen purge valve 72. Since hydrogen molecules are smaller than oxygen molecules and have higher diffusibility, it is possible to quickly shift to oxygen purging after hydrogen purging. This makes it possible to shorten the period required for purging as compared to the case where the valve-open period T2 of the oxygen purge valve 72 precedes the valve-open period T1 of the hydrogen purge valve 82.

In the present embodiment, the opening of the hydrogen purge valve 82 is started when the voltage generated in the fuel cell 22 becomes lower than a predetermined voltage threshold. This makes it possible to start purging when the impurities accumulated in the fuel cell 22 increase. As a result, it is possible to reduce unnecessary gas purging.

Further, in the present embodiment, the oxygen purge valve 72 is opened when the voltage does not recover to the voltage threshold value or more after the elapse of the predetermined period from the opening of the hydrogen purge valve 82. Accordingly, it is possible to reduce unnecessary gas purging.

In the present embodiment, the oxygen purge valve 72 is opened when the hydrogen concentration in the hydrogen-containing gas detected by the concentration sensor 92 falls below a predetermined concentration threshold value. Accordingly, it is possible to reliably prevent the oxygen gas from being purged in a situation in which the hydrogen concentration in the purged hydrogen gas is high.

The present embodiment is not limited to the above. For example, the purging of the oxygen-containing gas and the hydrogen-containing gas may be performed after the fuel cell 22 is stopped. In this case, after closing the oxygen valve 44 and the hydrogen valve 54, the controller 28 opens the hydrogen purge valve 82 without monitoring the cell voltage. When the valve-open period T1 of the hydrogen purge valve 82 has elapsed, the controller 28 closes the hydrogen purge valve 82. Thereafter, when the hydrogen concentration detected by the concentration sensor 92 falls below the concentration threshold, the controller 28 opens the oxygen purge valve 72. When the valve-open period T2 of the oxygen purge valve 72 has elapsed, the controller 28 closes the oxygen purge valve 72.

A description will be given below concerning the invention and effects that are capable of being grasped from the above descriptions.

(1) The fuel cell system (10) includes: the fuel cell (22) configured to generate electric power by electrochemical reactions between an oxygen gas and a hydrogen gas; the oxygen gas supply path (42) configured to supply the oxygen gas to the fuel cell (22); the oxygen circulation path (58) configured to return to the oxygen gas supply path (42) an oxygen-containing gas containing the oxygen gas discharged from the fuel cell (22); the hydrogen gas supply path (52) configured to supply the hydrogen gas to the fuel cell; the hydrogen circulation path (60) configured to return to the hydrogen supply path (52) a hydrogen-containing gas containing the hydrogen gas discharged from the fuel cell (22). The fuel cell system (10) further includes: the oxygen purge channel (70) configured to purge the oxygen-containing gas from the oxygen circulation path (58) to an outside of the fuel cell system (10); the hydrogen purge channel (80) configured to purge the hydrogen-containing gas from the hydrogen circulation path (60) to the outside of the fuel cell system (10); the oxygen purge valve (72) disposed on the oxygen purge channel (70); the hydrogen purge valve (82) disposed on the hydrogen purge channel (80); and the controller (28) configured to control the oxygen purge valve (72) and the hydrogen purge valve (82) in a manner that a valve opening period (T2) of the oxygen purge valve (72) does not overlap with a valve opening period (T1) of the hydrogen purge valve (82).

This substantially reduces the situation where both the oxygen and the hydrogen are contained in the purged gas at the same time, thereby avoiding the risk of causing combustion even if there is an ignition source.

(2) In the fuel cell system (10), the valve opening period (T1) of the hydrogen purge valve (82) may come earlier than a valve opening period (T2) of the oxygen purge valve (72). Thus, the period required for purging can be shortened as compared to the case where the valve opening period of the oxygen purge valve comes earlier than the valve opening period of the hydrogen purge valve.

(3) In the fuel cell system (10), the controller (28) may start opening the hydrogen purge valve (82) when a voltage at the fuel cell (22) falls below a predetermined voltage threshold value. This makes it possible to start purging when the impurities accumulated in the fuel cell increases. As a result, it is possible to reduce unnecessary gas purging.

(4) In the fuel cell system (10), the controller (28) may open the oxygen purge valve (72) when the voltage does not become a value equal to or higher than the voltage threshold value after a predetermined period has elapsed since the opening of the hydrogen purge valve (82). Accordingly, it is possible to reduce unnecessary gas purging.

(5) In the fuel cell system (10), the controller (28) may open the oxygen purge valve (72) when a concentration of hydrogen in the hydrogen-containing gas detected by a concentration sensor (92) provided in the hydrogen purge channel (80) falls below a predetermined concentration threshold. Accordingly, it is possible to reliably prevent the oxygen gas from being purged in a situation in which the hydrogen concentration in the purged hydrogen gas is high.

(6) In the fuel cell system (10), the purge direction (AR1) of the oxygen-containing gas purged from the oxygen purge channel (70) may be different from a purge direction (AR2) of the hydrogen-containing gas purged from the hydrogen purge channel (80). Thus, it is possible to more effectively prevent oxygen and hydrogen from being contained in the purged gas at the same time.

(7) In the fuel cell system (10), the outlet (70T) of the oxygen purge channel (70) may be disposed at a position spaced from the first surface (F1) of the moving object (100) on which the fuel cell system (10) is mounted, and the outlet (80T) of the hydrogen purge channel (80) may be disposed at a position spaced from the second surface (F2) of the moving object (100) opposite to the first surface (F1). Thus, it is possible to more effectively prevent oxygen and hydrogen from being contained in the purged gas at the same time.

Moreover, the present invention is not limited to the above-described disclosure, and various configurations can be adopted therein without departing from the essence and gist of the present invention.

The invention claimed is:

1. A fuel cell system comprising:
a fuel cell configured to generate electric power by electrochemical reactions between an oxygen gas and a hydrogen gas;
an oxygen gas supply path configured to supply the oxygen gas to the fuel cell;
an oxygen circulation path configured to return to the oxygen gas supply path an oxygen-containing gas containing the oxygen gas discharged from the fuel cell;
a hydrogen gas supply path configured to supply the hydrogen gas to the fuel cell;
a hydrogen circulation path configured to return to the hydrogen supply path a hydrogen-containing gas containing the hydrogen gas discharged from the fuel cell;
an oxygen purge channel configured to purge the oxygen-containing gas from the oxygen circulation path to an outside of the fuel cell system;
a hydrogen purge channel configured to purge the hydrogen-containing gas from the hydrogen circulation path to the outside of the fuel cell system;

an oxygen purge valve disposed on the oxygen purge channel;
a hydrogen purge valve disposed on the hydrogen purge channel; and
one or more processors that execute computer-executable instructions stored in a memory, wherein the one or more processors execute the computer-executable instructions to cause the fuel cell system to:
control the oxygen purge valve and the hydrogen purge valve in a manner that a valve opening period of the oxygen purge valve does not overlap with a valve opening period of the hydrogen purge valve.

2. The fuel cell system according to claim 1, wherein a valve opening period of the hydrogen purge valve is earlier than a valve opening period of the oxygen purge valve.

3. The fuel cell system according to claim 1, wherein the one or more processors cause the fuel cell system to:
start opening the hydrogen purge valve when a voltage at the fuel cell falls below a predetermined voltage threshold value.

4. The fuel cell system according to claim 3, wherein the one or more processors cause the fuel cell system to:
open the oxygen purge valve when the voltage does not become a value equal to or higher than the voltage threshold value after a predetermined period has elapsed since opening of the hydrogen purge valve.

5. The fuel cell system according to claim 3, wherein the one or more processors cause the fuel cell system to:
open the oxygen purge valve when a hydrogen concentration in the hydrogen-containing gas detected by a concentration sensor provided in the hydrogen purge channel falls below a predetermined concentration threshold.

6. The fuel cell system according to claim 1, wherein a purge direction of the oxygen-containing gas purged from the oxygen purge channel is different from a purge direction of the hydrogen-containing gas purged from the hydrogen purge channel.

7. The fuel cell system according to claim 1, wherein an outlet of the oxygen purge channel is disposed at a position spaced from a first surface of a moving object on which the fuel cell system is mounted, and an outlet of the hydrogen purge channel is disposed at a position spaced from a second surface of the moving object opposite to the first surface.

* * * * *